United States Patent

Niessner et al.

[11] Patent Number: 6,159,340
[45] Date of Patent: Dec. 12, 2000

[54] HYDROLYZED POLYMERS OF N-VINYLCARBOXAMIDES AS PAPER, PAPERBOARD AND CARDBOARD DRY STRENGTH ENHANCERS

[75] Inventors: Manfred Niessner, Schifferstadt; Claudia Nilz, Rödersheim-Gronau; Jens Utecht, Neulussheim; Martin Rübenacker, Altrip; Rudolf Schuhmacher, Böhl-Iggelheim, all of Germany

[73] Assignee: BASF Aktiengesellschaft, Ludwigshafen, Germany

[21] Appl. No.: 09/125,795

[22] PCT Filed: Feb. 20, 1997

[86] PCT No.: PCT/EP97/00801

§ 371 Date: Aug. 31, 1998

§ 102(e) Date: Aug. 31, 1998

[87] PCT Pub. No.: WO97/31518

PCT Pub. Date: Sep. 4, 1997

[30] Foreign Application Priority Data

Feb. 29, 1996 [DE] Germany .................. 196 07 674

[51] Int. Cl.⁷ .................................................. D21H 17/00
[52] U.S. Cl. .................................. 162/164.6; 162/168.2; 525/328.2
[58] Field of Search ................ 162/164.6, 168.2; 526/328.2

[56] References Cited

U.S. PATENT DOCUMENTS 2,721,140 10/1955 Weisgerber .
4,421,602 12/1983 Brunnmueller et al. .

FOREIGN PATENT DOCUMENTS

| 0 013 969 | 8/1980 | European Pat. Off. . |
| 0 036 993 | 10/1981 | European Pat. Off. . |
| 0 216 387 | 4/1987 | European Pat. Off. . |
| 0 251 182 | 1/1988 | European Pat. Off. . |
| 0 262 577 | 4/1988 | European Pat. Off. . |
| 0 331 047 | 9/1989 | European Pat. Off. . |
| 27 41 753 | 3/1979 | Germany . |
| 44 11 311 | 10/1995 | Germany . |
| WO 94 13882 | 6/1994 | WIPO . |

*Primary Examiner*—Bernard Lipman
*Attorney, Agent, or Firm*—Oblon, Spivak, McClelland, Maier & Neustadt, P.C.

[57] ABSTRACT

Partially hydrolyzed polymers of N-vinylcarboxamides obtainable by sole polymerization of N-vinylcarboxamides of the formula

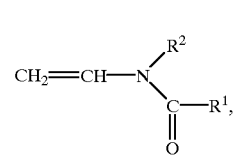
(I)

where $R^1$ and $R^2$ are each hydrogen or $C_1$- to $C_6$-alkyl, and elimination from the polymers of from 0.5 to 95 mol % of the groups of the formula

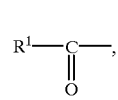
(II)

where $R^1$ is hydrogen or $C_1$- to $C_6$-alkyl, can be used as paper, paperboard and cardboard dry strength enhancers.

4 Claims, No Drawings

HYDROLYZED POLYMERS OF N-VINYLCARBOXAMIDES AS PAPER, PAPERBOARD AND CARDBOARD DRY STRENGTH ENHANCERS

The present invention relates to the use of partially hydrolyzed polymers of N-vinylcarboxamides as paper, paperboard and cardboard dry strength enhancers.

U.S. Pat. No. 2,721,140 discloses using polyvinylamine hydrochloride as an assistant in papermaking. The papers obtained have high wet strength.

U.S. Pat. No. 4,421,602 discloses partially hydrolyzed, water-soluble polymers of N-vinylformamide, which contain N-vinylformamide units and vinylamine units. The polymers are used as agents for enhancing flocculation, retention and drainage rate in papermaking.

EP-A-0 216 387 discloses agents for enhancing the dry strength of paper. They are water-soluble copolymers which contain vinylamine units and which are obtainable by copolymerizing N-vinylformamide with monoethylenically unsaturated monomers selected from the group consisting of vinyl acetate, vinyl propionate, $C_1$- to $C_4$-alkyl vinyl ethers, the esters, nitriles and amides of acrylic acid and methacrylic acid and N-vinylpyrrolidone and elimination of the formyl groups from the copolymers. The preferred N-vinylformamide copolymers are with vinyl acetate and have each of their monomer units hydrolyzed 30–100 mol %.

For the production of paper having high dry strength it is known to apply dilute aqueous solutions of synthetic polymers acting as dry strength enhancers to the surface of paper and drying the paper thus impregnated. The amounts of dry strength enhancer, ideally applied uniformly to the surface of the paper, range in general from 0.1 to 4% by weight, based on dry paper. Suitable dry strength enhancers are known for example from DE-B-2 741 753, EP-B-0 013 969 and EP-B-0 036 993. Since the dry strength enhancers are applied to the surface of the paper in the form of a dilute aqueous polymer solution, in which the polymer concentration is generally from 1 to 10% by weight, a considerable amount of water has to be evaporated in the subsequent drying process. The drying step is therefore very energy-intensive. Yet the capacity of the customary drying facilities on papermaking machines is not so large that papers having improved dry strength can be produced by application of aqueous polymer solutions at the maximum production speeds of the papermaking machines. On the contrary, the production speed of the papermaking machine has to be reduced when dry strength enhancers are applied to the surface of paper in order that the paper may dry sufficiently.

EP-B-0 251 182 discloses copolymers containing vinylamine groups in salt form, vinylformamide and acrylonitrile groups and optionally small amounts of acrylamide and acrylic acid groups. These copolymers are used for example in papermaking and act as drainage and retention aids and also as agents for enhancing the dry strength of paper.

It is an object of the present invention to provide a further processing aid for papermaking which leads to enhanced dry strength.

We have found that this object is achieved according to the invention by the use of hydrolyzed polymers of N-vinylcarboxamides obtainable by sole polymerization of N-vinylcarboxamides of the formula

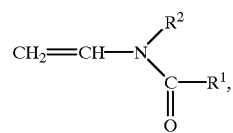

where $R^1$ and $R^2$ are each hydrogen or $C_1$- to $C_6$-alkyl, and elimination from the polymers of from 0.5 to 100 mol % of the groups of the formula

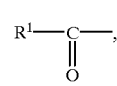

where $R^1$ is hydrogen or $C_1$- to $C_6$-alkyl, as paper, paperboard and cardboard dry strength enhancers.

Suitable monomers for preparing the polymers are N-vinylcarboxamides of the formula

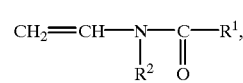

where $R^1$ and $R^2$ are identical or different and are each hydrogen or $C_1$- to $C_6$-alkyl. Suitable monomers include for example N-vinylformamide ($R^1=R^2=H$ in formula I), N-vinyl-N-methylformamide, N-vinylacetamide, N-vinyl-N-methylacetamide, N-vinyl-N-ethylacetamide, N-vinyl-N-methylpropionamide and N-vinylpropionamide. The polymers can be prepared by polymerizing the monomers mentioned either alone or mixed with each or one another. Preference is given to homopolymers of N-vinylformamide.

The polymerization is carried out according to known processes in the presence or else in the absence of inert solvents or inert diluents. Since polymerization in the absence of inert solvents or diluents usually leads to non-uniform polymers, polymerization in an inert solvent or diluent is preferred. Suitable are for example those inert diluents in which the N-vinylcarboxamides are soluble. Suitable media for the solution polymerization include for example inert solvents, such as methanol, ethanol, isopropanol, n-propanol, n-butanol, sec-butanol, tetrahydrofuran, dioxane, water and mixtures thereof. The polymerization can be carried out continuously or batchwise. The polymers are generally prepared using free-radical initiators.

Suitable free-radical initiators are preferably all those compounds which have a halflife of less than 3 hours at the particular polymerization temperature chosen. If the polymerization is started at a relatively low temperature and completed at a higher temperature, it is advantageous to use at least two initiators which decompose at different temperatures, namely to use for the start of the polymerization an initiator which decomposes at a low temperature and to complete the main polymerization with an initiator which decomposes at the higher temperature. It is possible to use water-soluble and water-insoluble initiators or mixtures of water-soluble and water-insoluble initiators. The water-insoluble initiators are then soluble in the organic phase. Initiators and appropriate temperature ranges are listed below by way of example.

40–60° C.:

acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis(4-methoxy-2,4-dimethylvaleronitrile), 2,2'-azobis(2-methyl-N-phenylpropionamidine) dihydrochloride, 2,2'-azobis(2-methylpropionamidine) dihydrochloride.

60–80° C.:

tert-butyl perpivalate, dioctanoyl peroxide, dilauroyl peroxide, 2,2'-azobis(2,4-dimethylvaleronitrile).

80–100° C.:

dibenzoyl peroxide, tert-butyl per-2-ethylhexanoate, tert-butyl permaleate, 2,2'-azobis(isobutyronitrile), dimethyl 2,2'-azobisisobutyrate, sodium persulfate, potassium persulfate, ammonium persulfate.

100–120° C.:

bis(tert-butyl peroxide)cyclohexane, tert-butyl peroxyisopropylcarbonate, tert-butyl peracetate, hydrogen peroxide.

120–140° C.:

2,2-bis(tert-butylperoxy)butane, dicumyl peroxide, di-tert-amyl peroxide, di-tert-butyl peroxide.

>140° C.:

p-menthane hydroperoxide, pinane hydroperoxide, cumene hydroperoxide and tert-butyl hydroperoxide.

If the initiators mentioned are used together with salts or complexes of heavy metals, for example copper, cobalt, manganese, iron, vanadium, nickel and chromium salts, or organic compounds such as benzoin, dimethylaniline or ascorbic acid, the halflives of the specified free-radical initiators can be reduced. For instance, tert-butyl hydroperoxide can be activated with just 5 ppm of copper(II) acetylacetonate to such an extent that polymerization is possible at as low as 100° C. The reducing component of redox catalysts can also be formed for example by compounds such as sodium sulfite, sodium bisulfite, sodium formaldehydesulfoxylate and hydrazine. Based on the monomers used in the polymerization, from 0.01 to 20, preferably from 0.05 to 10%, by weight of a polymerization initiator or of a mixture of a plurality of polymerization initiators are used. From 0.01 to 15% of the reducing compounds are added as redox component. Heavy metals are used within the range from 0.1 to 100 ppm, preferably from 0.5 to 10 ppm. It is frequently of advantage to use a combination of peroxide, reductant and heavy metal as redox catalyst.

The polymerization can also be carried out through the action of ultraviolet radiation, optionally in the presence of UV initiators. A polymerization under the action of UV radiation is carried out using the photoinitiators or sensitizers customary for the purpose. These are for example compounds such as benzoin and benzoin ethers, α-methylbenzoin or α-phenylbenzoin. It is also possible to use triplet sensitizers, such as benzil diketals. Sources of UV radiation include for example not only high energy UV lamps, such as carbon arc lamps, mercury vapor lamps or xenon lamps, but also low UV light sources, such as fluorescent tubes having a high blue content.

To prepare polymers having a low K value, the polymerization is advantageously carried out in the presence of regulators. Suitable regulators include for example organosulfur compounds. These include for example mercapto compounds, such as mercaptoethanol, mercaptopropanol, mercaptobutanol, mercaptoacetic acid, mercaptopropionic acid, butyl mercaptan and dodecyl mercaptan. Other suitable regulators include allyl compounds, such as allyl alcohol, aldehydes, such as formaldehyde, acetaldehyde, propionaldehyde, n-butyraldehyde and isobutyraldehyde, formic acid, ammonium formate, propionic acid, hydrazine sulfate and butenols. If the polymerization is carried out in the presence of regulators, from 0.05 to 20% by weight of regulator is required, based on the monomers used in the polymerization.

The polymerization of the monomers of the formula I is customarily effected in an inert gas atmosphere in the absence of atmospheric oxygen. During the polymerization it is customary to ensure thorough mixing of the reactants. In the case of relatively small batches, where safe removal of the heat of polymerization is ensured, the monomers can be copolymerized batchwise by heating the reaction mixture to the polymerization temperature and then allowing the reaction to proceed. These temperatures are within the range from 40 to 180° C., and the reaction can be carried out under atmospheric pressure, reduced pressure or else superatmospheric pressure. Polymers having high molecular weight are obtained on conducting the polymerization in water. This can be done, for example for the preparation of water-soluble polymers, in aqueous solution, as an water-in-oil emulsion or by the method of inverted suspension polymerization.

To avoid hydrolysis of the monomeric N-vinylcarboxamides during the polymerization in aqueous solution, the polymerization is preferably carried out within a pH range from 4 to 9, in particular from 5 to 8. In many cases it is advisable also to employ a buffer, for example to add primary or secondary sodium phosphate to the aqueous phase.

The polymers of N-vinylcarboxamides obtainable in this way, preferably poly-N-vinylformamide, have K values of from 8 to 300, preferably from 10 to 250, determined by the method of H. Fikentscher at 25° C. and pH 7 on 0.5% strength aqueous polymer solutions.

The hydrolyzed polymers to be used according to the invention are obtained from the above-described polymers by partial elimination of groups of the formula

from monomer units of the formula III to form amine or ammonium groups:

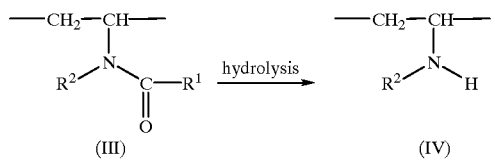

The substituents $R^1$ and $R^2$ in the formulae (II) and (III) are in each case as defined for the formula (I).

The hydrolysis is preferably carried out in the presence of water under the action of acids, bases or enzymes, but can also be carried out in the absence of acids, bases or enzymes. Depending on the reaction conditions during the hydrolysis, ie. on the amount of acid or base, based on the polymer to be hydrolyzed, and on the reaction temperature during the hydrolysis, different degrees of hydrolysis are obtained. The hydrolysis is carried on until at least 0.5 mol %, preferably from 1 to 50 mol %, of the polymerized monomer units III are eliminated from the polymer. Particular preference is given according to the invention to polymers containing from 1 to 20 mol % of vinylamine units and from 99 to 80 mol % of units of the formula III, preferably N-vinylformamide units.

Suitable acids for the hydrolysis include for example mineral acids, such as hydrogen halide (gaseous or in aqueous solution), sulfuric acid, nitric acid, phosphoric acid (orthophosphoric, metaphosphoric or polyphoshoric acid) and organic acids, for example $C_1$- to $C_5$-carboxylic acids, such as formic acid, acetic acid and propionic acid, or the aliphatic or aromatic sulfonic acids, such as methanesulfonic acid, benzenesulfonic acid or toluenesulfonic acid. The hydrolysis is preferably carried out using hydrochloric acid or sulfuric acid. When the hydrolysis is carried out with acids, the pH is from 0 to 5. From 0.05 to 1.5 equivalents of acid, preferably from 0.4 to 1.2, are required for example per formyl group equivalent in the polymer.

If the hydrolysis is carried out with bases, it is possible to use hydroxides of metals of the first and second main groups of the periodic table, suitable being for example lithium hydroxide, sodium hydroxide, potassium hydroxide, calcium hydroxide, strontium hydroxide and barium hydroxide. However, it is similarly possible to use ammonia and alkyl derivatives of ammonia, for example alkyl- or aryl-amines, eg. triethylamine, monoethanolamine, diethanolamine, triethanolamine, morpholine or aniline. When the hydrolysis is carried out with bases, the pH is from 8 to 14. The bases can be used in the solid, liquid or, if possible, even in the gaseous state with or without dilution. Preference is given to using ammonia, sodium hydroxide solution or potassium hydroxide solution as bases for the hydrolysis. The hydrolysis in the acid or alkaline pH region is effected for example at temperatures from 30 to 170° C., preferably from 50 to 120° C. The hydrolysis is complete after about from 2 to 8, preferably from 3 to 5, hours. A particularly advantageous procedure involves adding the bases or acids in aqueous solution for the hydrolysis. After the hydrolysis it is customary to carry out a neutralization, so that the pH of the hydrolyzed polymer solution is from 2 to 8, preferably from 3 to 7. Neutralization is necessary if further hydrolysis of partially hydrolyzed polymers is to be prevented or delayed. The hydrolysis can also be effected with the aid of enzymes. The K value of the hydrolyzed polymers is from 8 to 300, preferably from 10 to 250 (measured in 5% strength aqueous sodium chloride solution at a polymer concentration of from 0.5% by weight, a pH of 1.5 and a temperature of 25° C.).

The above-described partially hydrolyzed N-vinylcarboxamide polymers can be used in the manufacture of all known grades of paper, paperboard and cardboard, for example for enhancing the dry strength of writing, printing and packaging papers. The papers can be manufactured from a multiplicity of different fiber materials, for example from sulfite or sulfate pulp in the bleached or unbleached state, groundwood, pressure groundwoods (PGW), CTMP or waste paper. The papermaking process takes place for example within the pH range from 4.5 to 8, preferably at a pH from 6 to 7. The pH of the paper stock suspension is set for example by adding sulfuric acid or aluminum sulfate. Preference is given to using only small amounts of aluminum sulfate. The partially hydrolyzed N-vinylcarboxamide polymers are added to the paper stock as paper, paperboard and cardboard dry strength enhancers prior to drainage in amounts of for example from 0.01 to 5, preferably from 0.5 to 2%, by weight, based on dry fibers.

Compared with copolymers of N-vinylformamide, the hydrolyzed N-vinylcarboxamide polymers to be used according to the invention provide paper products having enhanced dry strength.

In the Examples which follow, parts and percentages are by weight. The K value of the polymers was determined by the method of H. Fikentscher, Cellulosechemie 13 (1932), 58–64 and 71–74, at 20° C. in 5% strength aqueous sodium chloride solutions at pH 7 and a polymer concentration of 0.5%; $K=k \cdot 10^3$. The viscosities of the polymer solutions were determined at 20° C. using a Brookfield viscometer.

In laboratory trials, the sheets were produced in a Rapid-Köthen laboratory sheet former. The dry breaking length was determined according to DIN 53 112 Sheet 1. The whiteness of the paper sheets was measured with the aid of a reflectance photometer (Elrefo) in accordance with DIN 53 145. The CMT value was determined in accordance with DIN 53 143 and the dry bursting pressure in accordance with DIN 53 141.

EXAMPLES

Polymer 1

Homopolymer of N-vinylformamide having a K value of 90, from which 5.3% of the formyl groups were eliminated by hydrolysis with hydrochloric acid. Present as an aqueous solution (polymer content: 14.9% by weight, solids content: 16.5% by weight, viscosity: 11,500 mPas, pH 5).

Polymer 2

Homopolymer of N-vinylformamide having a K value of 90, from which 10.4% of the formyl groups were eliminated by hydrolysis with hydrochloric acid. Present as an aqueous solution (polymer content: 14.3% by weight, solids content: 16.5% by weight, viscosity: 8460 mPas, pH 5).

Polymer 3

Homopolymer of N-vinylformamide having a K value of 90, from which 21.6% of the formyl groups were eliminated by hydrolysis with hydrochloric acid. Present as an aqueous solution (polymer content: 15.0% by weight, solids content: 17.8% by weight, viscosity: 5500 mPas, pH 3.8).

Polymer 4

Homopolymer of N-vinylformamide having a K value of 90, from which 100% of the formyl groups where eliminated by hydrolysis with hydrochloric acid. Present as an aqueous solution (polymer content: 12.4% by weight, solids content: 24.0% by weight, viscosity: 940 mPas, pH 3.8).

Polymer 5

Commercially available dry strength enhancer based on a cationic polyacrylamide having a molar mass $M_w$ of 1.1 million. The polymer is used in 10% strength aqueous solution.

Examples

Sheets of paper having a basis weight of 120 g/m² were produced in a Rapid-Köthen sheet former. The paper stock was 80% waste paper and 20% bleached beech sulfite pulp having a freeness of 44° SR (Schopper-Riegler) in 0.5% strength aqueous suspension. The pH of the stock suspension was 6.0. The suspension was divided into 6 equal parts, 5 of which were admixed with the polymers indicated in the table under (b) to (f).

(a) The stock suspension contained no further additive.

(b)–(e) The stock suspension was admixed with 0.5%, based on dry fiber substance, of polymers 1 to 4.

(f) The stock suspension was admixed with 0.5%, based on dry fiber substance, of polymer 5.

The stock suspensions were each drained in a Rapid-Köthen sheet former. Tests (a) and (f) are comparative examples, and tests (b), (c), (d) and (e) are examples according to the invention.

The resulting sheets (a) to (f) were subjected to measurements of the dry breaking length, the dry bursting pressure and the CMT value (cf. table 1).

TABLE 1

| Test | (a) | (b) | (c) | (d) | (e) | (f) |
|---|---|---|---|---|---|---|
| Polymer | — | 1 | 2 | 3 | 4 | 5 |
| Dry breaking length [m] | 2622 | 3208 | 3147 | 2762 | 2843 | 3054 |
| Dry bursting pressure [kPa]* | 160 | 203 | 183 | 183 | 176 | 194 |
| CMT value [N]* | 118 | 151 | 137 | 123 | 147 | 156 |

*in respect of a basis weight of 120 g/m²

We claim:

1. A process for enhancing the dry strength of paper, paperboard and cardboard, which comprises a hydrolyzed polymers of N-vinylcarboxamides obtained by sole polymerization of N-vinylcarboxamides represented by formula

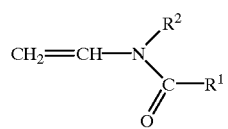

wherein
$R^1$ and $R^2$ are each hydrogen or $C^1$- to $C^6$-alkyl, and elimination from the polymers of from 1 to 10.4 mol % of the groups represented by formula (II):

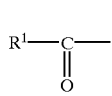

wherein $R^1$ is hydrogen or $C^1$- to $C^6$-alkyl.

2. A process as claimed in claim 1, wherein the compound represented by formula (I) is N-vinylformamide.

3. A process as claimed in claim 1, wherein the partially hydrolyzed polymers are added to the paper stock prior to sheet formation in amounts of from 0.01 to 5% by weight, based on dry fibers.

4. A process as claimed in claim 1, wherein the partially hydrolyzed polymers are added to the paper stock prior to sheet formation in amounts of from 0.5 to 2% by weight, based on dry fibers.

* * * * *